(12) United States Patent
Ambrose et al.

(10) Patent No.: US 7,230,956 B1
(45) Date of Patent: Jun. 12, 2007

(54) TECHNIQUES FOR FRAME DETECTION AND WORD ALIGNMENT

(75) Inventors: Desmond Ambrose, Ottawa (CA); Antoine Alary, Woodlawn (CA)

(73) Assignee: Altera Corporation, San Jose, CA (US)

( * ) Notice: Subject to any disclaimer, the term of this patent is extended or adjusted under 35 U.S.C. 154(b) by 1035 days.

(21) Appl. No.: 10/340,203

(22) Filed: Jan. 10, 2003

(51) Int. Cl.
 *H04J 3/07* (2006.01)

(52) U.S. Cl. ............... 370/510; 370/503; 370/509; 370/511; 370/512; 370/514; 370/520; 375/365; 375/356; 375/355; 375/366; 375/359

(58) Field of Classification Search ............ None
See application file for complete search history.

(56) References Cited

U.S. PATENT DOCUMENTS 3,985,967 A * 10/1976 Colton et al. ............ 370/510

6,804,316 B1 * 10/2004 Shectman ............ 375/368

OTHER PUBLICATIONS

Synchronous Optical Network (SONET) Tutorial, Aug. 3, 2000, [retrieved on Aug. 27, 2003]. Retrieved from the Internet: <http://www.onforum.com/tutorials/sonnet/index.html>, topic 1-10, 48 pages total.

* cited by examiner

*Primary Examiner*—Raj K. Jain
(74) *Attorney, Agent, or Firm*—Townsend and Townsend and Crew LLP (57) ABSTRACT

A system receives input data frames that are configured according to a SONET or an SDH standard. The input data is converted to parallel data. The system provides groups of bits along parallel signal lines. In each group of bits, N contiguous bits in the group form a complete word of input data. The system identifies the boundary between complete words in the input data by comparing subsets of the bits to predefined framing patterns. The system then aligns the input data based on the location of each word using the boundary information. The output data of the system includes data that is word aligned. The system can also detect boundaries between the frames.

24 Claims, 3 Drawing Sheets

TECHNIQUES FOR FRAME DETECTION AND WORD ALIGNMENT

BACKGROUND OF THE INVENTION

The present invention relates to techniques for frame detection and word alignment for SONET and SDH data, and more particularly, to detection frame boundaries and to aligning the internal data path to the word boundary of data in a SONET or an SDH standard.

Synchronous optical network (SONET) and Synchronous Digital Hierarchy (SDH) are standards for data transmission across optical telecommunications networks. Data bits that are transmitted according to a SONET or an SDH standard are grouped into frames. Each frame contains numerous data bytes. The data bytes typically contain 8 data bits. The data bytes are typically grouped into words for internal processing. Any number of bits and bytes can form a word (e.g., 64 bits/8 bytes per word).

Each frame contains an overhead section and a payload section. The overhead section includes bits specified by a SONET protocol. The payload section includes the data bits that are being transferred from one location to another.

SONET uses a basic transmission rate of STS-1 that is equivalent to 51.84 Mbps. Higher-level signals are integer multiples of the base rate. For example, STS-3 is three times the rate of STS-1 ($3 \times 51.84 = 155.52$ Mbps). An STS-12 rate is $12 \times 51.84 = 622.08$ Mbps.

STS-1 is a specific sequence of 810 bytes (6,480 bits), which includes various overhead bytes and an envelope capacity for transporting payloads. It can be depicted as a 90-column by 9-row structure. With a frame length of 125 microseconds $\mu s$ (8,000 frames per second), STS-1 has a bit rate of 51.840 Mbps. The order of transmission of bytes is row-by-row from top to bottom and from left to right (most significant bit first).

The first three columns of the STS-1 frame are for the transport overhead. Each of the three columns contains 9 bytes, for a total of 27 bytes. Of these, 9 bytes are overhead for the section layer, and 18 bytes are overhead for the line layer. The remaining 87 columns constitute the STS-1 envelope capacity (payload and path overhead).

A receiver does not necessarily know where words or frames begin and end when it receives a serial stream of SONET data. Therefore, it would be desirable to provide techniques for aligning the data path inside a receiver to the word boundary of an input data stream.

BRIEF SUMMARY OF THE INVENTION

The present invention provides systems and methods for aligning the data path inside a receiver to the word boundary of an input data stream. The input data stream can be organized according to a Synchronous Optical Network (SONET) standard or Synchronous Digital Hierarchy (SDH) standard. The present invention also provides techniques for locating boundaries between SONET/SDH frames in an input data stream.

According to the present invention, a system receives serial input data bits that are configured according to a SONET or an SDH standard. The input bits are converted to N parallel data bits, where N is the number of bits in a word. A word may comprise multiple bytes.

A system of the present invention provides groups of bits along parallel signal lines. In each group of bits, N contiguous bits in the group form a complete word of input data. The system of the present invention identifies the boundary between complete words in the input data by comparing subsets of the bits to predefined framing patterns.

The system of the present invention outputs word aligned data based on the input data and the location of complete words. The words alignment can be accomplished, for example, by multiplexing subsets of the input data using the boundary information that identifies the location of complete words. The output data of the system includes words that are properly word aligned. Techniques of the present invention also indicate the boundaries between each frame in the input data stream.

DETAILED DESCRIPTION OF THE INVENTION

Figure 1:
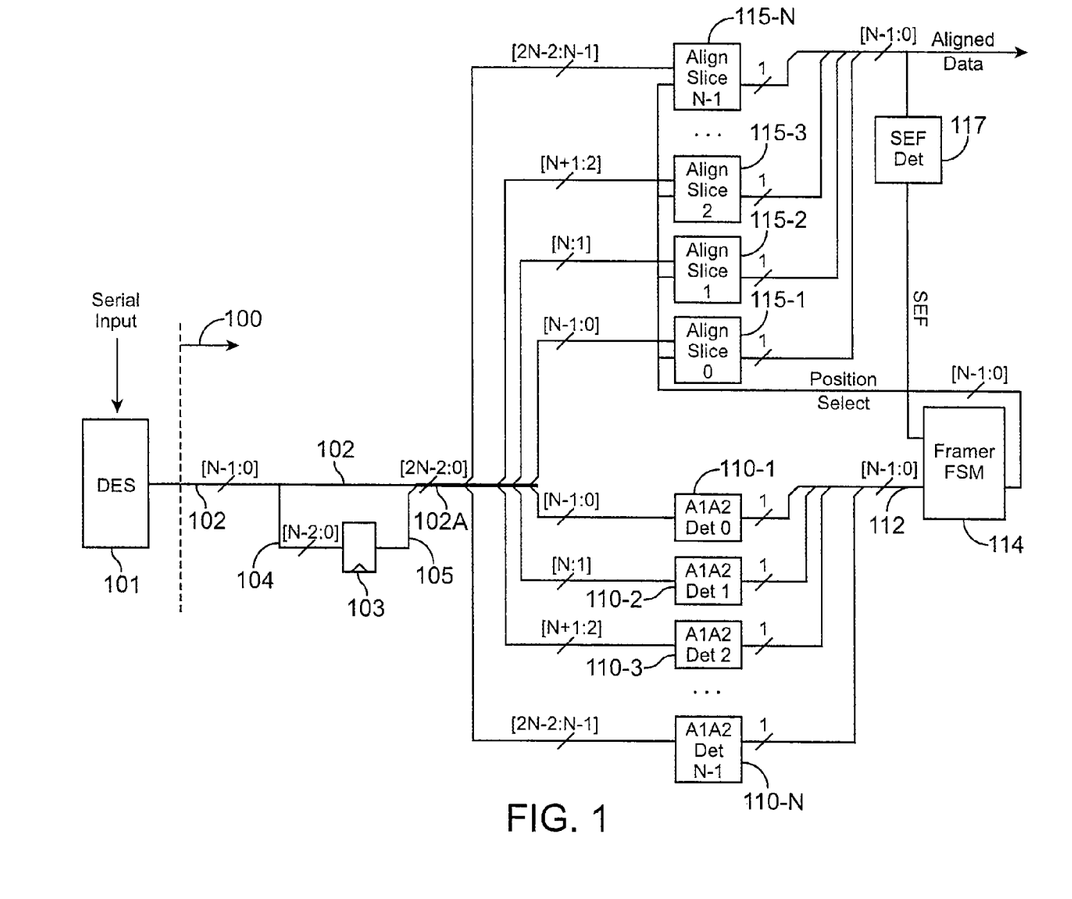
FIG. 1 illustrates a block diagram of a data alignment system according to the principles of the present invention.

FIG. 1 illustrates an embodiment of the present invention. Deserializer 101 receives an input data stream in a serial format as shown in FIG. 1. The input data stream comprises bits that are organized according to a SONET or an SDH communications standard.

The present invention is described primarily in the context of the SONET standard for illustrative purposes only. It should be understood that the techniques and principles of the present invention apply equally to data transfer using the Synchronous Digital Hierarchy (SDH) standard. The techniques of the present invention can be used for locating words and frame boundaries in SDH frames. Although the terminology for SONET and SDH standards differ, the function of these two standards is almost identical.

Deserializer 101 converts the input data bits from serial data into parallel data. By converting the input bits into words with N bits, the data can be processed at a slower data rate than the data rate of the input data signal. It is difficult to design some receiver circuits (such as a CMOS field programmable gate array) to process 8-bit wide bytes at frequencies that are common in SONET. For example, OC-48 operates at 311 MHz at 8-bit bytes, and OC-192 operates at 2488 MHz at 8-bit bytes. Converting the data to N-bit words allows a receiver circuit to process the data at a slower data rate (where N is greater than the number of bits per byte).

Deserializer 101 is a serial-to-parallel converter such as a shift register that converts serial data into parallel data. Deserializer 101 provides parallel data to circuitry 100 as shown in FIG. 1. Circuitry 100 includes the circuit elements to the right of the dotted line in FIG. 1. Circuitry 100 may be incorporated into an integrated circuit such as a programmable logic device (PLD), a field programmable gate array (FPGA), or a programmable logic array (PLA).

Deserializer 101 provides parallel data to circuitry 100 along N parallel signal lines 102. In FIG. 1, the variable N represents the number of bits in a word. For example, a word may comprise 8 bits, 16 bits, 32, bits, or 64 bits for internal processing.

Deserializer (DES) 101 provides N parallel bits of arbitrary alignment to circuitry 100 along N parallel signals lines 102. The N parallel bits are designated with numbers from 0 to N−1.

The N parallel data bits provided by DES 101 do not necessarily include a single complete word. For example, the N bits output by DES 101 may include portions of two adjacent words instead of one complete word.

Referring to FIG. 1, a portion of the bits on signal lines 102 are also routed onto signal lines 104. Bits 0 to N−2 are routed onto signal lines 104. Thus, bits 0 to N−1 are passed on signal lines 102 and bits 0 to N−2 are also passed on signal lines 104. Only bit N−1 is not passed on signal line 104.

The N−1 bits on signal lines 104 are stored by N−1 flip-flops 103 for one clock cycle. The box labeled 103 in FIG. 1 represents a plurality of flip-flops. There is one flip-flop for each of signal lines 104. For example, if N equals 64, there are 63 signal lines 104 and 63 flip-flops 103.

Flip-flops 103 output the N−1 bits on signal lines 105 one clock cycle after flip-flops 103 receives these N−1 bits. Signal lines 105 are grouped with signal lines 102 to form signal lines 102A as shown in FIG. 1.

Signal lines 102A have the N parallel bits that are most recently received by circuitry 100 from DES 101 on lines 102 in the current clock cycle. Signal lines 102A also have N−1 of the N parallel bits received by circuitry 100 in the previous clock cycle from DES 101. These N−1 bits were stored by flip-flops 103 for one clock cycle. Therefore, the N−1 bits are one clock cycle behind the most recently received N bits on lines 102 and 102A.

Signal lines 102A carry a total of 2N−1 bits on 2N−1 signal lines. The 2N−1 bits on lines 102A include the N bits output by DES 101 in the current clock cycle and N−1 of the N bits output by DES 101 in the previous clock cycle. The bits on signal lines 102A are designated as bits 0 to 2N−2, and comprise the 2N−1 consecutive bits that have been most recently received at the serial input of DES 101.

DES 101 outputs arbitrarily selected groups of N bits in parallel. Each group of arbitrarily selected N parallel bits may include bits from two adjacent words. Circuitry 100 can join selected bits together from two consecutive sets of N parallel bits output by DES 101, so that the selected bits form a complete word of data.

To accomplish this task, bits from two consecutive words often need to be combined to form a complete word. Circuitry 100 performs this combination by storing N−1 of the bits received from DES 101 in the previous clock cycle in flip-flops 103. These N−1 bits are then grouped with a set of N parallel bits received from DES 101 in the current clock cycle. Therefore, the 2N−1 bits on lines 102A include N−1 bits received in the previous clock cycle that can be joined with the current set of N bits.

Exactly one set of N contiguous bits of the 2N−1 most recently received bits on lines 102A form a complete data word. Circuitry 100 (as discussed in further detail below) identifies the bits locations of a complete word. The output of circuitry 100 includes N parallel bits that form a complete word.

According to an embodiment of the present invention, the word boundary is defined to coincide with the frame boundary. This implies that all SONET column boundaries are also word boundaries. There are also word boundaries within the column.

Referring again to FIG. 1, contiguous subsets of bits 0 to 2N−2 on signal lines 102A are provided to frame detectors 110-1 to 110-N as shown in FIG. 1. Each one of frame detectors 110-1 to 110-N receives one of N sets of contiguous N bits from among bits 0 to 2N−2 on signal lines 102A. Every possible combination of contiguous N bits on signal lines 102A is provided to one of detectors 110. There are N possible combinations of contiguous N bits from among bits 0 to 2N−1.

For example, bits 0 to N−1 are provided as input signals to detector 110-1, bits 1 to N are provided as input signals to detector 110-2, bits 2 to N+1 are provided as input signals to detector 110-3, and bits N−1 to 2N−2 are provided as input signals to detector 110-N.

As stated above, the input data received by DES 101 can be grouped into N-bit words for internal processing. The groups of N parallel bits output by DES 101 may not correspond to a word, because DES 101 arbitrarily selects N bits. Circuitry 100 can group the output signals of DES 101 into complete words.

The N parallel output bits of DES 101 may correspond to portions of two adjacent words in the serial input data stream. For example, bits 0 to N−10 may correspond to a portion of a first word in the input data, and bits N−9 to N−1 may correspond to a portion of a second word in the input data.

Detectors 110-1 to 110-N identify the location of a complete N-bit word of input data by attempting to match N different subsets of the bits on signal lines 102A to framing patterns that are specified by the SONET (or SDH) standard.

Each possible combination of N contiguous bits on signal lines 102A is provided to the input of one of comparators 110-1 to 110-N. One of these bit combinations comprises a complete word. Each of detectors 110 compares a different subset of the N contiguous bits it receives to a predefined framing pattern. If the subset of N bits matches the framing pattern according to specific criteria, that subset of N bits is located at the correct bit positions of a complete word.

Figure 2:
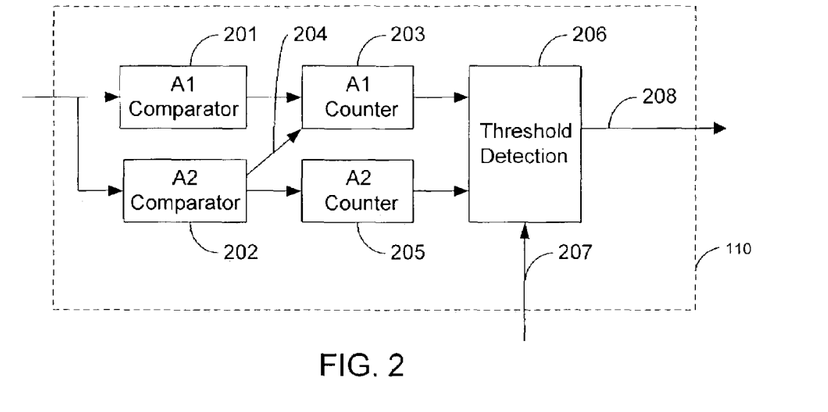
FIG. 2 illustrates an example of a boundary detection block according to the principles of the present invention.

Further details of the operation of detectors 110-1 through 110-N will now be discussed with respect to FIG. 2. FIG. 2 illustrates an embodiment of one of detectors 110-1 through 110-N. Thus, each one of detectors 110-1 through 110-N includes the circuitry of FIG. 2, according to an embodiment of the present invention.

Detector 110 include an A1 comparator 201, an A2 comparator 202, an A1 counter 203, an A2 counter 205, and a threshold detection circuit 206 coupled together as shown in FIG. 2. The A1 and A2 bytes in the context of a SONET frame are well known to those of skill in the art.

Comparators 201 and 202 each receive the N parallel input bits received by one of detectors 110. The N parallel input bits correspond to one of the N different patterns of N contiguous bits discussed above.

When a high number of bit errors are present in the input serial stream, it is desirable to consider less bits of the framing pattern so that frame is more likely to be found. The tradeoff is that the circuit may falsely detect a frame boundary, causing the framer to return to searching for the framing pattern.

When a low number of bit errors are present in the input serial stream, it is desirable to consider more bits of the framing pattern so that it is likely the circuit will not falsely detect a frame boundary. The tradeoff is that the circuit may not immediately detect a frame boundary, because of a bit error in the bits of the framing pattern being considered.

An embodiment of detector 110 allows flexibility to choose the number of bits that must match the predefined framing pattern according to two techniques. The first technique is to select a subset of the input vector to each comparator for consideration. This technique is referred to as comparator resolution. The resolution may be set to 2, 4, 8, or 16. A resolution of 2 is chosen because it allows a user fine control of the framing requirements. Resolutions of 4, 8, or 16 are chosen because they are efficiently implemented with 4-input look up tables common in FPGAs. Values larger than 16 are not as desirable, because an increased amount of circuit area is required to implement larger resolutions. The value of 16 is only possible if the data path width is equal to or greater than 16.

The second technique for controlling the number of bits that must match the predefined framing pattern is to provide thresholds to pattern detection counters. The threshold can be set to 1, 2, 3, etc. . . . Large threshold values are less desirable, because an increased amount of circuit area is required to implement larger thresholds.

There is no threshold for STS-1 because there is only one A1 and one A2 byte per frame. The maximum threshold for STS-3 is 3. The maximum threshold for STS-12 is 12. The maximum threshold for STS-48 is 12, if the data is processed with a data path 32 bits wide. The maximum threshold for STS-48 is 16 with a data path 16 bits wide. The maximum threshold for STS-192 and larger STS signals is 16. A threshold of 16 limits the size of the counter to 4 bits due to area considerations. The resolution and threshold is controlled separately for A1 and A2 detection.

Comparator 201 compares sets of input bits to a first half of a predefined framing pattern. The first half of a predefined framing pattern corresponds to the first byte in a SONET STS-1 frame, or the first N bytes in a SONET STS-N frame, where N is, e.g., 1, 3, 12, 24, 48, 192, etc. The first byte in a SONET STS-1 frame is the overhead byte A1. The A1 byte is part of the SONET transport overhead section of a frame. The A1 byte equals F6. F6 is a hexadecimal representation of 8 bits.

Comparator 201 compares a portion of the N input bits to a predefined pattern that equals the A1 byte. The portion of the N input bits is determined by the comparator resolution and can be, e.g., 2, 4, 8, or 16. The comparator 201 compares the least significant bits of the input first. For example, if the resolution is set to 4, input bits [3:0] are compared.

Comparator 202 compares input bits to a second half of a predefined framing pattern. The second half of a predefined framing pattern corresponds to the second byte in a SONET STS-1 frame, or the second N bytes in a SONET STS-N frame, where N is, e.g., 1, 3, 12, 24, 48, 192, etc. The second byte in a SONET STS-1 is the overhead byte A2. The A2 byte is also part of the SONET transport overhead section of the frame. The A2 byte equals 28. 28 is a hexadecimal representation of 8 bits.

Comparator 202 compares a portion of the N input bits to a predefined pattern that equals the A2 byte. The subset of the N input bits is determined by the comparator resolution and can be 2, 4, 8, or 16. The comparator considers the most significant bits of the input first. For example, if the resolution is set to 4 and the data path width is 16 bit, input bits [15:12] are compared.

A1 counter 203 keeps track of the number of times comparator 201 detects that consecutive sets of input bits match F6. Counter 203 maintains the current state of a first count value. Each time that comparator 201 receives a set of input bits that equal F6, comparator 201 sends a signal to A1 counter 203 that increases the first count value. After the first set of input bits equal F6, subsequent input bits must equal F6 and must be consecutive to further increase the first count value by one (e.g., to two, three, four, etc.).

If the input value to comparator 201 does not equal F6, A1 counter 203 resets the first count value to zero, unless A2 comparator 202 detects an input value equal to 28, signified by signal 204.

A2 counter 205 keeps track of the number of times comparator 202 detects that consecutive sets of input bits match 28. Counter 205 maintains the current state of a second count value. Each time that comparator 202 receives input bits that equal 28, comparator 202 sends a signal to A2 counter 205 that increases the second count value. After the first input that equals 28, subsequent input values must equal 28 and must be consecutive to further increase the second count value by one (e.g., to two, three, four, etc.).

Threshold detection circuit 206 receives count values from A1 counter 203 and A2 counter 205 as input. Threshold detection circuit 206 also receives as input first and second threshold values input by signal 207. Threshold detection circuit 206 compares the first count value to the first threshold level. Threshold detection circuit 206 compares the second count value to the second threshold level.

When the first count value reaches the first threshold level and the second count value reaches the second threshold level, the output signal 208 of threshold detection circuit 206 changes state. For example, output signal 208 transitions from a logic low state to a logic high state when both the first and second threshold levels are reached.

Table 1 is a truth table for a first example of detector 110. In the example given in Table 1, the input bits are compared to a framing pattern considering 32 bits. The input bits are received along an 8-bit data path. The resolution of comparator 201 is set to 8. The first threshold is set to 2. The resolution of comparator 202 is set to 8. The second threshold is set to 2.

In Table 1, A1 Count refers to the first count value, and A2 Count refers to the second count value. When both the first and the second threshold levels are reached, the A1A2 Detect signal 208 becomes 1.

TABLE 1

| Time | Input Bits [7 . . . 0] | | | | | | | | A1 Count | A2 Count | A1A2 Detect |
|---|---|---|---|---|---|---|---|---|---|---|---|
| 0 | X | X | X | X | X | X | X | X | 0 | 0 | 0 |
| 1 | 1 | 1 | 1 | 1 | 0 | 1 | 1 | 0 | 1 | 0 | 0 |
| 2 | 1 | 1 | 1 | 1 | 0 | 1 | 1 | 0 | 2 | 0 | 0 |
| 3 | 0 | 0 | 1 | 0 | 1 | 0 | 0 | 0 | 2 | 1 | 0 |
| 4 | 0 | 0 | 1 | 0 | 1 | 0 | 0 | 0 | 2 | 2 | 1 |
| 5 | 0 | 0 | 1 | 0 | 1 | 0 | 0 | 0 | 2 | 3 | 0 |
| 6 | X | X | X | X | X | X | X | X | 0 | 0 | 0 |

Table 2 is a truth table for a second example of detector 110. In the example given in Table 2, the input bits are compared to a framing pattern considering 10 bits. The input bits are received along an 8-bit data path. The resolution of comparator 201 is set to 8. The first threshold is set to 1. The resolution of comparator 202 is set to 2. The second threshold is set to 1. When both the first and the second threshold levels are reached, the A1A2 Detect signal becomes 1.

after the first byte of the frame (the first A1 byte). Because frame boundary implies word boundary, signal 208 also indicates whether the N input data bits are in the bit positions of a complete word.

TABLE 2

| Time | Input Bits [7 ... 0] | | | | | | | | A1 Count | A2 Count | A1A2 Detect |
|---|---|---|---|---|---|---|---|---|---|---|---|
| 0 | X | X | X | X | X | X | X | X | 0 | 0 | 0 |
| 1 | 1 | 1 | 1 | 1 | 0 | 1 | 1 | 0 | 1 | 0 | 0 |
| 2 | 1 | 1 | 1 | 1 | 0 | 1 | 1 | 0 | 2 | 0 | 0 |
| 3 | 0 | 0 | 1 | 0 | 1 | 0 | 0 | 0 | 2 | 1 | 1 |
| 4 | 0 | 0 | 1 | 0 | 1 | 0 | 0 | 0 | 2 | 2 | 0 |
| 5 | 0 | 0 | 1 | 0 | 1 | 0 | 0 | 0 | 2 | 3 | 0 |
| 6 | X | X | X | X | X | X | X | X | 0 | 0 | 0 |

Table 3 is a truth table for a third example of detector 110. In the example given in Table 3, the input bits are compared to a framing pattern considering 30 bits. The input bits are received along a 64-bit data path. The resolution of comparator 201 is set to 16. The first threshold is set to 1. The resolution of comparator 202 is set to 2. The second threshold is set to 7.

In Table 3, column T refers to time, column A refers to the first count value A1, column B refers to the second count value A2, and column C refers to the A1A2 detect signal. When both the first and the second threshold levels are reached, the A1A2 Detect signal becomes 1.

The frame boundary information can be used by processing functions not shown in FIG. 1. For example, the frame boundary information can be used to produce location strobes that indicate the location of particular bytes in each frame as discussed in further detail in co-pending, commonly assigned U.S. patent application Ser. No. 10/340,869, entitled Efficient Delayed Overhead Processing Techniques, to Ambrose et al., filed concurrently herewith, which is incorporated by reference herein.

Frame boundary implies column boundary and word boundary, while the reverse is not true. Word boundary does

TABLE 3

| T | Input [15 ... 0] | | | | | | | | | | | | | | | | Input [63 ... 48] | | | | | | | | | | | | | | | | A | B | C |
|---|---|---|---|---|---|---|---|---|---|---|---|---|---|---|---|---|---|---|---|---|---|---|---|---|---|---|---|---|---|---|---|---|---|---|---|
| 0 | X | X | X | X | X | X | X | X | X | X | X | X | X | X | X | X | X | X | X | X | X | X | X | X | X | X | X | X | X | X | X | X | 0 | 0 | 0 |
| 1 | 1 | 1 | 1 | 1 | 0 | 1 | 1 | 0 | 1 | 1 | 1 | 1 | 0 | 1 | 1 | 0 | 1 | 1 | 1 | 1 | 0 | 1 | 1 | 0 | 1 | 1 | 1 | 1 | 0 | 1 | 1 | 0 | 1 | 0 | 0 |
| 2 | 1 | 1 | 1 | 1 | 0 | 1 | 1 | 0 | 1 | 1 | 1 | 1 | 0 | 1 | 1 | 0 | 1 | 1 | 1 | 1 | 0 | 1 | 1 | 0 | 1 | 1 | 1 | 1 | 0 | 1 | 1 | 0 | 2 | 0 | 0 |
| 3 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 2 | 1 | 0 |
| 4 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 2 | 2 | 0 |
| 5 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 2 | 3 | 0 |
| 6 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 2 | 4 | 0 |
| 7 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 2 | 5 | 0 |
| 8 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 2 | 6 | 0 |
| 9 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 0 | 0 | 1 | 0 | 1 | 0 | 0 | 0 | 2 | 7 | 1 |
| 10 | X | X | X | X | X | X | X | X | X | X | X | X | X | X | X | X | X | X | X | X | X | X | X | X | X | X | X | X | X | X | X | X | 0 | 0 | 0 |

Signal 208 indicates a known offset from the beginning of a SONET frame. Detector 110 has located the transition between A1 and A2, and asserts signal 208 high after the transition from A1 to A2 by a number of clock cycles equal to the second threshold. For example, STS-12, second threshold equal to 2, the signal 208 is set (12+2) clock cycles not imply column or frame boundary, and column boundary does not imply frame boundary.

The output of threshold detection circuit 206 is coupled to the output of detector 110. The output signal of one of detectors 110-1 to 110-N changes state (e.g., goes high) when that detector determines that its input bits are in the correct bit positions of one complete word. The output signals of the rest of detectors 110-1 to 110-N remain unchanged (e.g., remain low) in the absence of bit errors. In the presence of bit errors, more than one output signal of detectors 110-1 to 110-N may go high.

Detectors 110 can have different resolution factors for first and second comparators. Detectors 110 can have different first and second threshold values for the first and the second count values.

All of the output signals of detectors 110-1 to 110-N are provided to framer finite state machine (framer FSM) 114 as signals 112, as shown in FIG. 1. Framer 114 samples and stores the vector output signals 112 of detectors 110.

Each detector 110 has one output signal. Therefore, detectors 110-1 to 110-N output N signals. Only one of the output signals of detectors 110 indicates the bit location of words in the SONET input signal. For example, one of the output signals of detectors 110 is a logic high, while the other output signals of detectors 110 are a logic low.

Framer 114 samples the vector 112 while in the out of frame state. If the vector has any bit set, then framer 114 stores the vector, and goes into an aligning state.

Figure 3:
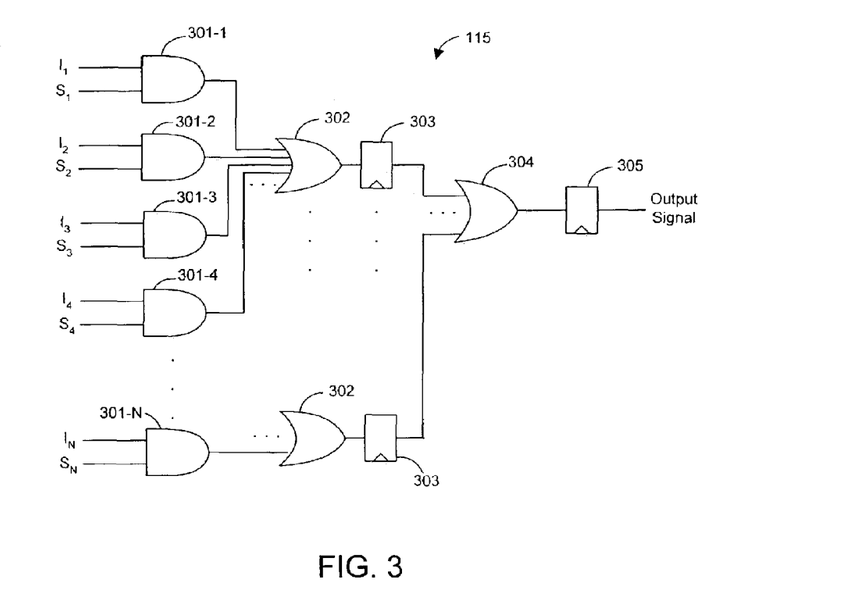
FIG. 3 illustrates an example of a word alignment block according to the principles of the present invention.
Figure 4:
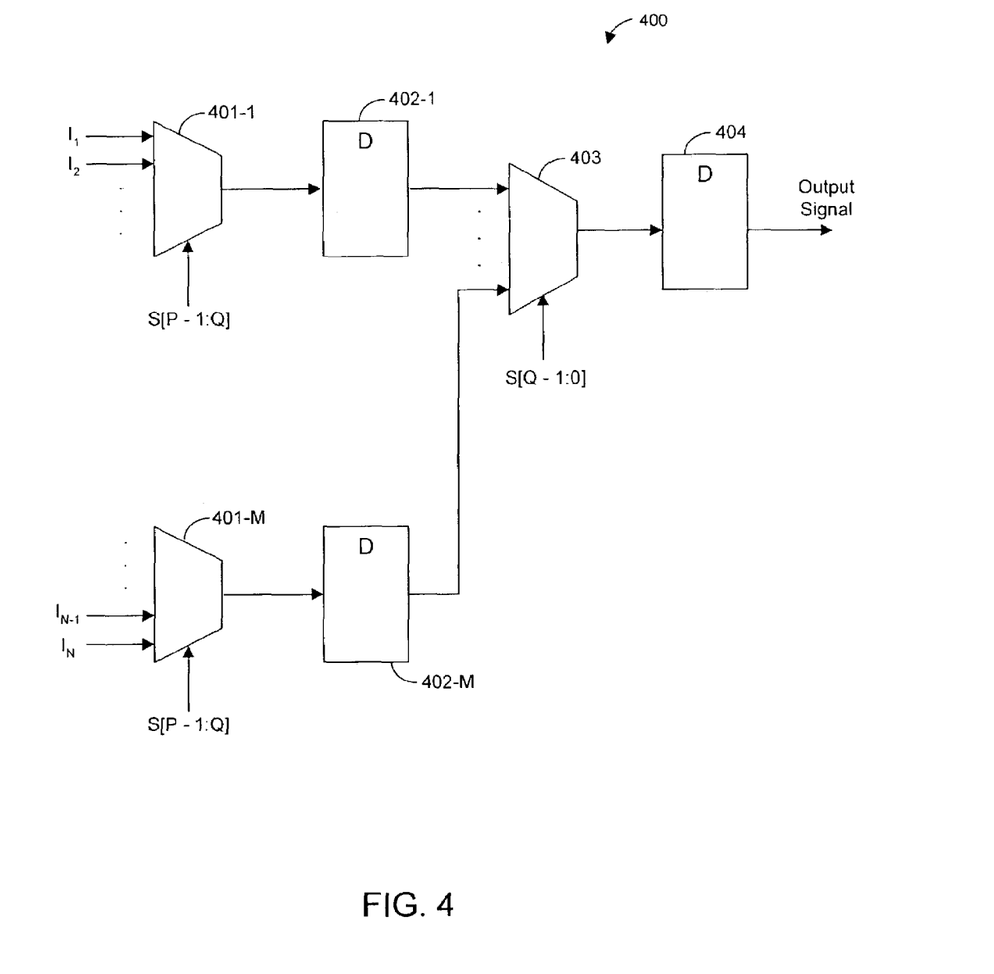
FIG. 4 illustrates another example of a word alignment block according to the principles of the present invention.

In the embodiment of FIG. 4 (discussed below), framer 114 encodes the value of vector 112. Details of an exemplary embodiment of this encoding process are now discussed. An offset position counter is set to zero. The offset counter is incremented by one, and the stored vector is shifted by one until the least significant bit position of the stored vector is high. Thus, the offset counter is incremented by one until it locates the least significant bit in vector 112 that is a logic high. The offset counter then contains the encoded value of the offset. This encoding process is performed for the embodiment of FIG. 4, but not for the embodiment of FIG. 3.

In an alternative embodiment of the encoding process, the offset counter is reset to its maximum value. It is then decremented by one, and the stored vector 112 is shifted by one until the most significant bit position of the stored vector 112 is high. Thus, the offset counter is decremented by one until it locates the most significant bit in vector 112 that is a logic high. The offset counter then contains the encoded value of the offset.

Framer 114 provides the offset value to N align slice blocks 115-1 through 115-N as the Position Select (S) signals shown in FIG. 1. The position select signal is encoded for the embodiment of FIG. 4, and is a sampled vector 112 for embodiment of FIG. 3. Because framer 114 stores the value of the Position Select signals S, framer 114 can maintain the values of these signals throughout the length of an entire frame. Thus, after words A1 and A2 have passed through circuitry 100, framer 114 continues to maintain the one Position Select signal value that indicates the location of a complete word in the input 2N−1 bits.

FIG. 3 illustrates an embodiment of an align slice block 115. Each align slice block 115-1 through 115-N may include the circuitry of FIG. 3. The output signals of AND gates 301-1 to 301-N are passed to OR gates 302. The output signals of OR gates 302 are stored by flip-flops 303. The output signals of flip-flops 303 are passed to inputs of OR gate 304. The output of OR gate 304 is stored by flip-flop 305. The output signal of flip-flop 305 is the output signal of the align slice block 115.

Flip-flops 303 and 305 may be controlled by clock signals (not shown). Flip-flops 303 and 305 are introduced into circuits 115 to create pipelines stages that maintain a low number of logic levels. In further embodiments, OR gate 304 and flip-flop 305 may be eliminated, for example, when the data path is 8 or 16 bits wide.

Each align slice block 115-1 through 115-N receives N input signals (designated $I_1$–$I_N$ in FIG. 3) from among the 2N−1 input signals on signal lines 102A. Each align slice block 115-1 through 115-N receives each of the N Position Select signals $S_1$–$S_N$. In the embodiment of FIG. 3, the Position Select signal is N bits wide and the Position Select signal is not encoded by framer 114 using the offset counter as discussed above.

In the embodiment shown in FIG. 3, one of the Position Select signals $S_X$ is a logic high, and the rest of the Position Select signals S are a logic low. Sx can be any of Position Select signals $S_1$–$S_N$, depending upon the output signals of detectors 110. The Position Select $S_X$ signal that is high indicates the bit locations of complete words in the SONET input data stream. Align slice blocks 115-1 to 115-N use the Position Select signals to word align bits in the input signal I.

Because only one of the Position Select signals S is high, AND gates 301 only pass the input signal $I_X$ bit that is located at the same bit position as the high Position Select signal $S_X$. For example, if bit $S_1$ is a logic high (one) and bits $S_{2-N}$ are low, AND gates 301-2 to 301-N output logic lows (zeros), and the output of AND gate 301-1 equals Is.

The input signal $I_X$ bit that is passed by one of AND gates 301 is transmitted all the way to the output of align slice block 115 through OR gates 302/304 and flip-flops 303/305. Thus, the output signal of align slice block 115 equals the input signal $I_X$ bit that is received by the AND gate 301-X. AND gate 301-X is the AND gate 301 that receives the Position Select $S_X$ that is a logic high at one of its input terminals.

Because each of align slice blocks 115-1 to 115-N passes input signal $1_X$ to its output terminal, the combined output signals of align slice blocks 115-1 to 115-N comprise a word of N bits that are properly word aligned. Thus, the first bit in the aligned data output of blocks 115-1 to 115-N is the first bit in a word of the input data, and the last bit in the aligned data output is the last bit in a word of the input data.

Block 117 is the severely error frame detector. Block 117 checks bits in a frame of the aligned data output of blocks 115 to detect bit errors that may indicate a bad framing pattern, according to well known principles. If block 117 detects a bad framing pattern, it outputs a signal SEF to framer 114. The SEF signal is used by framer 114 to determine when framer 114 needs to return to the out of frame state to look for a frame boundary again.

In embodiment of FIG. 3, there may be more than one $S_X$ in the presence of a particular bit errors. With more than one $S_X$, the output of circuit 115 is $I_{X1}$ OR $I_{X2}$ OR .... When this occurs, framer 114 can go out of frame. Eventually, framer 114 finds the frame correctly.

FIG. 4 illustrates an alternative embodiment of an align slice block 115. Circuit 400 shown in FIG. 4 solves the problems that occur when more than one of the bits in vector 112 is a logic high, which may happen if sufficient bit errors occur in the considered framing pattern. As discussed above, framer 114 encodes vector 112 by detecting the least (or the most) significant bit in vector 112 that is high. The Position Select signal output of framer 114 is an encoded value that indicates the position of only one high bit in vector 112.

Circuit 400 is also an improvement over the embodiment of FIG. 3, because circuit 400 is a smaller circuit than the circuit of FIG. 3. Circuit 400 in FIG. 4 performs the function of one of align slice blocks 115. N circuits 400 can perform the functions of N align slice blocks 115-1 through 115-N.

Circuit 400 includes multiplexers 401-1 through 401-M, flip-flops 402-1 through 402-M, multiplexer 403, and flip-flop 404. M equals N divided by the number of input bits into each multiplexer 401.

For example, the number of input bits into each multiplexer 401 may be 8 or 16. The numbers 8 and 16 are chosen to provide area efficiency and a low number of logic levels. The number of input bits into each multiplexer 401 can be 16 only when the data path is 16 bits or more.

Flip-flops 402 and 404 are introduced to create pipeline stages that maintain a low number of logic levels. Multiplexer 403 and flip-flop 404 may eliminated, for example, when the data path is 8 or 16 bits wide.

Multiplexers 401-1 through 401-M receive N input bits $I_1-I_N$ from signal lines 102A. For example, multiplexer 401-1 through 401-M in align slice block 115-1 receive input bits 0 to N−1. Each multiplexer 401 receives a subset of these input bits.

Each multiplexer 401 receives a subset of the Position Select signals $S_{P-1}-S_Q$ at their respective select inputs, as shown in FIG. 4. The subset is determined by the size of N and M. P=lg(N); and Q=l g(M), where 1 g is base 2 logarithm. Each of multiplexers 401 selects one of its input bits and stores the selected bit in a corresponding flip-flop 402 in response to signals $S_{P-1}-S_Q$. The bits stored by flip-flops 402-1 through 402-M are provided to the inputs of multiplexer 403.

Multiplexer 403 receives a subset of the Position Select signals $S_{Q-1}-S_0$ at its select input. For example if N=64, and M=8, then Position Select bits S[5:3] go to multiplexers 401, and Position Select bits S[2:0] go to multiplexer 403. Multiplexer 403 selects one of the input bits I in response to signals $S_{SQ-1}-S_0$ and stores the selected signal in flip-flop 404. The output signal of flip-flop 404 comprises one bit in the aligned data output signal of circuitry 100.

Circuit 400 is a two-stage circuit that performs the function of a one-stage N input multiplexer that selects one of the N input signals in response to a P bit long select signal. Circuit 400 performs the multiplexing function in two stages over two clock cycles. Circuit 400 outputs the input bit $I_1-I_N$ that is indicated by the Position Select bits.

A specific example of how circuitry 100 can align words on the input data received on signal lines 102 is now discussed. It should be understood that the numbers used in this example are used for illustrative purposes only and do not limit the scope of the present invention. According to this specific example, words in the input data are 4 bits long (N=4). The bits in the serial input data signal are referred to as A1, A2, A3, A4, B1, B2, B3, B4, C1, C2, etc. According to this designation, each number indicates a unique bit, and each letter indicates a unique word. Thus, the four A bits form one word. In this sequence, A1 is received first at the input of deserializer 101, followed by A2, A3, etc.

Deserializer 101 converts 4 arbitrary bits from the serial input data stream into 4 parallel bits. For example, deserializer 101 may convert bits A3, A4, B1, and B2 into 4 parallel bits on signal lines 102. Three flip-flops 103 receive bits A4, B1, and B2 in one clock cycle. In the next clock cycle, bits B3, B4, C1, C2 are received on signal lines 102, and flip-flops 103 provide bits A4, B1, B2 on lines 105. Thus, signal lines 102A now have seven bits in the following order: A4, B1, B2, B3, B4, C1, C2, where A4 is at position 0. This process is repeated for subsequent sets of four bits.

Four detectors 110-1 to 110-4 each receive one of four patterns of four contiguous bits from lines 102A. For example, detector 110-2 receives bits B1, B2, B3, B4 as input signals from lines 102A in that order. Bits B1, B2, B3, B4 are aligned according to the word B in the serial input data stream. Detector 110-2 also receives subsequent sets of four bits that are also aligned the same as words in the serial input data stream (such as C1, C2, C3, C4). The first few word aligned sets of input bits received by detector 110-2 match the framing patterns F6 and 28, indicating the presence of words A1 and A2.

After the number of matches to the framing patterns reaches the first and second threshold levels, detector 110-2 outputs a logic high signal. The output is detected by framer 114, and the framer produces a position select signal. For the FIG. 3 AND/OR embodiment of align slice blocks 115, this select is N bits wide. This logic high signal appears in the second bit position $S_2$ of the Position Select signal. Because signal $S_2$ is high, each one of align slice blocks 115 passes the second input bit 12 that it receives to its output.

For the FIG. 4 embodiment of align slice 115, framer 114 produces an encoded select signal, with the value selecting the second position (binary 01). In this example, 00 selects first position, 01 selects second, 10 selects third, 11 selects fourth. Because signal S is binary 01, each one of the align slice blocks 115 passes the second input bit 12 that it receives to its output.

Block 115-1 receives bits A4, B1, B2, B3 and passes the second bit B1. Block 115-2 receives bits B1, B2, B3, B4, and passes the second bit B2. Block 115-3 receives bits B2, B3, B4, C1 and passes the second bit B3. Block 115-4 receives bits B3, B4, C1, C2, and passes the second bit B4.

The aligned data output of circuitry 100 is B1, B2, B3, B4. Circuitry 100 also word aligns subsequent sets of four bits. For example, circuitry 100 receives a 4 bit parallel signal C3, C4, D1, D2, and converts into a 4 bit parallel signal C1, C2, C3, C4 using previously received bits B4, C1, C2.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. For example, the present invention encompasses any SONET standard such as STS-1, STS-3, STS-12, STS-24, STS-48, STS-192, etc. The present invention also includes locating words in SDH frames. It is intended that the invention not be limited to the particular embodiment disclosed, but that the invention will include all embodiments and equivalents falling within the scope of the claims.

What is claimed is:

1. A system for detecting locations of words in an input data stream that has been converted to sets of parallel data, the system comprising:
   storage circuits coupled to store a first set of the parallel data, wherein the system receives a second set of the parallel data subsequent to the first set of the parallel data, and a third parallel data set comprises the first set and the second set of the parallel data;
   detector circuits comprising comparators that compare the third parallel data set to predefined framing patterns to provide position signals that indicate bit locations of words in the input data stream and boundaries between frames in the input data stream; and
   logic circuits that select word aligned data bits from the third parallel data set based on the bit locations indicated by the position signals.

2. The system of claim 1 wherein bits in the input data stream are organized according to a SONET standard.

3. The system of claim 1 wherein bits in the input data stream are organized according to a SDH standard.

4. The system of claim 1 further comprising:
a memory circuit that stores the position signals before they are provided to the logic circuits.

5. The system of claim 1 wherein each of the detector circuits comprises:
a first comparator;
a second comparator;
a first counter that counts a first number of times the first comparator detects that at least a portion of a first subset of the third parallel data set matches a first framing pattern; and
a second counter that counts a second number of times the second comparator detects that at least a portion of the first subset of the third parallel data set matches a second framing pattern.

6. The system of claim 5 wherein each of the detector circuits further comprises:
a threshold detection circuit in one of the detector circuits that outputs a position signal indicating the first subset of the third parallel data set matches the location of words in the input data stream when the first number reaches a first threshold level and the second number reaches a second threshold level.

7. The system of claim 5 wherein:
the first comparator compares 2, 4, 8, or 16 least significant bits of the first subset of the third parallel data set to the first framing pattern; and
the second comparator compares 2, 4, 8, or 16 most significant bits of the first subset of the third parallel data set to the second framing pattern.

8. The system of claim 1 wherein each of the logic circuits comprises:
a first plurality of logic gates, each of the first logic gates performing AND functions on one bit in a subset of the third parallel data set and one of the position signals; and
a second plurality of logic gates that perform OR functions on output signals of the first logic gates.

9. The system of claim 1 wherein each of the logic circuits comprises:
a first plurality of logic gates, each of the first logic gates performing a first stage of multiplex functions on subsets of the third parallel data set and the position signals; and
a second plurality of logic gates that perform a second stage of multiplex functions on output signals of the first logic gates.

10. The system of claim 9 further comprising:
an offset counter that provides the position signals by encoding output signals of the detector circuits by locating a least or a most significant bit among the output signals that is a logic high.

11. The system of claim 1 wherein each of the words in the input data stream has N bits, and the system comprises N detector circuits and N logic circuits.

12. A method for detecting locations of words in an input data stream that includes bits, the method comprising:
receiving and storing a first parallel set of the bits;
receiving a second parallel set of the bits after the first parallel set of the bits, wherein the first parallel set and the second parallel set of the bits are grouped into third parallel data bits;
detecting bit locations of words in the input data stream by comparing subsets of the third parallel data bits to framing patterns to provide position signals; and
selecting word aligned data bits from among subsets of the third parallel data bits based on the bit locations indicated by the position signals.

13. The method of claim 12 wherein the detecting bit locations of words in the input data stream further comprises detecting boundaries between frames in the input data stream.

14. The method of claim 12 wherein bits in the input data stream are organized according to a SONET standard.

15. The method of claim 12 wherein bits in the input data stream are organized according to a SDH standard.

16. The method of claim 12 further comprising:
storing the position signals in memory; and
sampling the position signals.

17. The method of claim 12 wherein detecting the bit locations of words in the input data stream further comprises:
counting a first number of times consecutive subsets of the third parallel data bits match a first framing pattern; and
counting a second number of times consecutive subsets of the third parallel data bits match a second framing pattern.

18. The method of claim 17 wherein detecting the bit locations of words in the input data stream further comprises:
providing one of the position signals to indicate that a subset of the third parallel data bits matches the location of words in the input data stream when the first number reaches a first threshold level and the second number reaches a second threshold level.

19. The method of claim 12 wherein detecting the bit locations of words in the input data stream further comprises:
comparing subsets of the third parallel data bits to the framing patterns using a resolution of 2, 4, 8, or 16.

20. The method of claim 12 wherein selecting the aligned data bits from among subsets of the third parallel data bits further comprises:
performing AND functions, each AND function being performed on one of the third parallel data bits and one of the position signals.

21. The method of claim 20 wherein:
results of the AND functions are combined using OR functions to provide the word aligned data bits.

22. The method of claim 12 wherein selecting the word aligned data bits from among subsets of the third parallel data bits further comprises:
multiplexing subsets of the third parallel data bits using first multiplexers.

23. The method of claim 22 wherein selecting the word aligned data bits from among subsets of the third parallel data bits further comprises:
multiplexing output signals of the first multiplexers using second multiplexers to provide the word aligned data bits.

24. The method of claim 23 wherein detecting the bit locations of words in the input data stream by comparing the subsets of the third parallel data bits to the framing patterns to provide the position signals further comprises:
  counting a first number of times consecutive subsets of the third parallel data bits match a first framing pattern;
  counting a second number of times consecutive subsets of the third parallel data bits match a second framing pattern;
  providing word detection signals that indicate that a subset of the third parallel data bits matches the location of words in the input data stream when the first number reaches a first threshold level and the second number reaches a second threshold level; and
  encoding the word detection signals by locating a least or a most significant bit among the word detection signals that is a logic high to provide the position signals.

* * * * *